United States Patent [19]
Klein

[11] Patent Number: 5,724,260
[45] Date of Patent: Mar. 3, 1998

[54] CIRCUIT FOR MONITORING THE USAGE OF COMPONENTS WITHIN A COMPUTER SYSTEM

[75] Inventor: Dean A. Klein, Lake City, Minn.

[73] Assignee: Micron Electronics, Inc., Nampa, Id.

[21] Appl. No.: 524,330

[22] Filed: Sep. 6, 1995

[51] Int. Cl.[6] ................................................ G06F 11/34
[52] U.S. Cl. .................. 364/550; 364/551.01; 364/264.4; 395/184.01
[58] Field of Search ........................... 364/483, 550, 364/551.01, 569; 395/200.11, 835–839, 184.01

[56] References Cited

U.S. PATENT DOCUMENTS

| | | | |
|---|---|---|---|
| 4,400,783 | 8/1983 | Locke, Jr. et al. | 364/483 |
| 4,590,550 | 5/1986 | Eilert et al. | 395/183.21 |
| 4,821,178 | 4/1989 | Levin et al. | 395/184.01 |
| 4,831,564 | 5/1989 | Suga | 364/551.01 |
| 5,301,122 | 4/1994 | Halpern | 364/483 |
| 5,388,156 | 2/1995 | Blackledge, Jr. et al. | 380/4 |
| 5,483,153 | 1/1996 | Leeb et al. | 324/76.12 |
| 5,499,340 | 3/1996 | Barritz | 395/184.01 |
| 5,572,672 | 11/1996 | Dewitt et al. | 395/184.01 |

*Primary Examiner*—Lance Leonard Barry
*Attorney, Agent, or Firm*—Arnold, White & Durkee

[57] ABSTRACT

A usage monitor circuit monitors the mount of use of various components within a computer system. The circuit includes a plurality of timers and counters that are respectively coupled to the various components to be monitored such that the counters record the number of times the components are activated and the timers record the cumulative times the components are activated. The usage monitor circuit also includes a tamper protection unit that indicates whether the circuit has been tampered with.

5 Claims, 1 Drawing Sheet

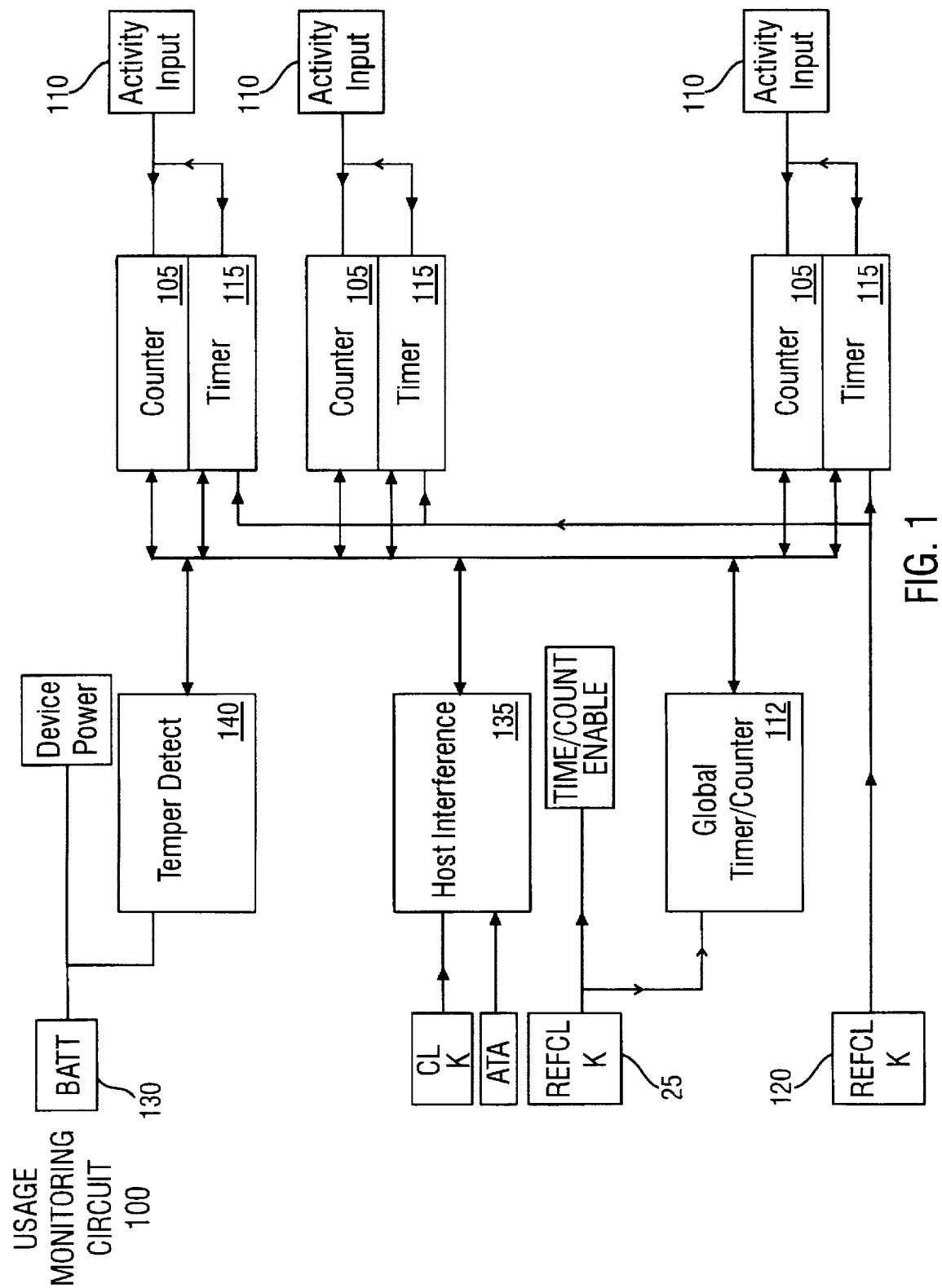

CIRCUIT FOR MONITORING THE USAGE OF COMPONENTS WITHIN A COMPUTER SYSTEM

BACKGROUND OF THE INVENTION

This invention relates in general to monitoring the usage of components within a computer system. More specifically, the invention discloses an economical apparatus for monitoring the number of times a component has been accessed and the cumulative amount of time that a component has been used.

Many personal computers are sold but then returned for various reasons by the buyers. Many of these computers have never been used. These computers may be resold as new machines. Other computers, however, have been unpacked, powered up and used. This precludes a manufacturer from reselling the computer as a new machine. However, if the computer was only turned on and run for a brief period of time, many of the components may have never been used.

When computers are returned, it would be desirable for there to be a method to determine if certain components in the computer were never used. This would allow the manufacturer to disassemble the computer and place the unused components into a new system that could be sold as new. Furthermore, it may be possible to resell the computer as a new machine. Also, if there were a method or apparatus to determine how much use various components received, an educated decision could be made on whether to reuse the components.

The ability to measure the amount of use certain computer components have received would also be very helpful in the field of service and support. Computer system supervisors or network administrators could evaluate when certain devices were in need of maintenance prior to the device crashing. This could prevent extended periods of downtime on a computer network while it is being repaired.

The computer industry also has many companies that lease computers to other businesses. These leases can be for a certain number of days or several years. A problem that arises for the leasing company when the computers are returned; there is no way to determine how much use the computer received during the lease period. Thus, the computer could be in need of maintenance, yet the leasing company is unaware. A device that measures the amount of use computer components receive could also permit use-based leasing of computer systems.

SUMMARY OF THE INVENTION

This invention addresses the problems discussed above. An electronic device in accordance with the invention monitors the amount of use of one or more components within a personal computer. These components can include the hard disk drive, system battery, power supply, etc.

A timing source and a counter have inputs connected to the components to be monitored. This allows to measurement of the time that a component has been used and the number of times that it has been used. The data in the counter and timer may be easily accessed by a program run on the computer. A tamper protection unit indicates if the usage monitoring device has been tampered with.

BRIEF DESCRIPTION OF THE DRAWINGS

FIG. 1 is block diagram showing a usage monitoring circuit in accordance with the invention.

DETAILED DESCRIPTION OF SPECIFIC EMBODIMENTS

Referring to FIG. 1, a usage monitoring circuit 100 is shown. The monitoring circuit 100 contains a plurality of counter units 105 (referred to simply as a counter). Each counter 105 is coupled to a component to be monitored (not shown) such that the counter 105 records the number of times an activity input 110 from the component is activated indicating the number of times the component itself has been activated. The selection of a counter is a design choice for the implementer and a matter of routine for those of ordinary skill having the benefit of this disclosure. Practical counter sizes are 16, 24 and 32 bits.

In a simple embodiment, a one-bit register can be used as a counter unit 105 to indicate in binary fashion whether the corresponding activity input 110 has ever been activated. In this embodiment, only the first activity input from each monitored component is recorded in the counter 105 and the timer 115. This provides a binary indication whether the monitored components have ever been activated.

The activity input 110 is a signal from the monitored component that indicates it is being used. An example of such a signal is the hard disc drive activity LED signal. A timer unit 115 is also coupled to each component to be monitored such that the timer 115 also receives the activity input 110. Timers 115 record the respective amounts of time that each activity input 110 is activated. The timers 115 are also coupled to a time-based reference clock 120. The time base 120 may be internal or external as desired, as well known to those of ordinary skill. As with the counters 105, the selection of a timer 115 is a design choice for the implementer and a matter of routine for those of ordinary skill having the benefit of this disclosure. A practical time base is the 14.318 MHz clock signal present on the personal computer mother board.

The counters 105 and timers 115 are also coupled to the system power ("VCC") 125. In the arrangement shown in FIG. 1, the timers 115 will only be incremented when the reference clock signal 120 is present, VCC 125 is present, and the monitored device is being accessed.

Furthermore, the counters 105 and timers 115 are coupled to a host interface 135. The host interface 135 allows the system CPU (not shown) to access data from the counters 105, timers 110, and other internal registers (not shown).

Also coupled to the host interface 135 is a global timer/counter 112. The global timer/counter receives an activity input directly from the system power VCC 125. This permits monitoring of aggregate system power-on time and thus of global system usage. A 32-bit counter running at one increment per second will count for $2^{32}-1$ seconds, i.e., some 136.2 years, which should be adequate for most purposes.

The usage monitoring circuit 100 also contains a tamper protection unit 140 to reduce the chance of illicit alteration of the counter and timer data. The tamper protection unit 140 is coupled to the host interface 135 and the system battery ("VBATT") 130. The tamper protection unit 140 can be of any convenient form. In one embodiment, a bit in the tamper protection unit 140 indicates every time that battery power has been removed since initialization. The bit can only be reset by sending a special code to the tamper protection unit. The current register contents of the counters 105 and timers 115 are processed by hardware internal to the tamper protection unit 140, which computes a code required to reset an anti-tamper bit.

To reset the anti-tamper bit, a computer program is run on the target machine (i.e., the machine that has the tamper bit to be reset). The program queries the usage monitor circuit 100, which in response computes and provides to the program a code based on the register content of the usage monitor 100. The code is transmitted verbally, electronically, or in some other fashion to a machine running a second computer program, preferably a machine different from the target machine to ensure the security of the system. The second program computes a reset key, which is transmitted by suitable means to the usage monitor circuit (perhaps automatically via a network connection, or perhaps manually via operator input to the first computer program through a keyboard or other input device). The usage monitor 100 receives the reset key and verifies that it is correct; if so, the usage monitor 100 resets the tamper bit, else it does not reset the tamper bit.

The tamper protection unit 140 may be configured so that the machine does not boot if the counters have been tampered with and not reset. It would be possible to have multiple tamper protection units 140 to protect multiple components, just as multiple counters 105 and timers 115 are used to monitor multiple components.

In another, simpler embodiment, the tamper protection unit 140 simply counts the number of times that power goes from off to on at the VBATT 130. This may be accomplished by "blowing" a bit in an electrically erasable one-time programmable memory (referred to as an $E^2$ memory, not shown), i.e., by changing the default 1 status of the bit to a 0. Each time the battery is removed and replaced, which could indicate tampering, a bit in the $E^2$ memory is blown, thus indicating the number of times that the battery has been removed.

The circuit 100 may be mounted directly on a system mother board. Its design lends itself to other devices as well. It may be implemented in a single integrated circuit or it could be implemented by using several devices. It may also be designed into the devices to be monitored. For example, the circuit may be added to a hard disc drive to profile usage of the hard drive only. The device can also be used in electronic devices other than a personal computer such as automobile electronics. While the invention has been described in conjunction with specific embodiments thereof, it will be apparent to those of ordinary skill having the benefit of this disclosure that other modifications and changes therein in addition to the examples discussed above may be made without departing from the spirit and scope of the invention.

I claim:

1. A usage monitor circuit for a computer system having a system power supply and further having a plurality of components, referred to as monitored components, said monitored components being configured to be selectively activated, said usage monitor circuit comprising:

(a) a plurality of monitor units respectively associated with said monitored components, each said monitor unit comprising (1) a counter unit, and (2) a timer unit;

(b) each said monitor unit being connected to receive a series of activity input signals, each indicating that the respective monitored component is activated, and to record the number and cumulative duration of the activity input signals so received in a nonvolatile data store;

(c) a global activity monitor unit connected to receive one or more applications of system power and to record the number and cumulative duration of said one or more applications of system power in a nonvolatile data store; and (d) a tamper detection unit.

2. A usage monitor circuit for a computer system having a component, referred to as a monitored component, and a system power supply, the usage monitor circuit comprising:

(a) a monitor unit comprising one or more of (1) a counter unit, and (2) a timer unit;

(b) said monitor unit being connected (1) to receive an activity input signal when said monitored component is activated and (2) to record at least the first activity input signal so received in a nonvolatile data store; and (c) a global activity monitor unit connected to receive one or more applications of system power, and to record at least the first application of system power in a nonvolatile data store.

3. The usage monitor circuit of claim 2, wherein said global activity monitor unit comprises one or more of (1) a counter unit, and (2) a timer unit.

4. A computer system comprising (i) one or more components referred to as monitored components, a system power supply, and (ii) a usage monitor circuit, said usage monitor circuit comprising:

(a) a monitor unit comprising one or more of (1) a counter unit, and (2) a timer unit;

(b) said monitor unit being connected (1) to receive an activity input signal when said monitored component is activated and (2) to record at least the first activity input signal so received in a nonvolatile data store; and (c) a global activity monitor unit connected to receive one or more applications of system power, and to record at least the first application of system power in a nonvolatile data store.

5. The computer system of claim 4, wherein said global activity monitor unit comprises one or more of (1) a counter unit, and (2) a timer unit.

* * * * *